March 24, 1953  W. L. H. DOYLE ET AL  2,632,235
METHOD OF FORMING VALVE GUIDES
Filed Sept. 20, 1947
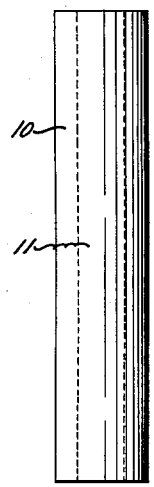
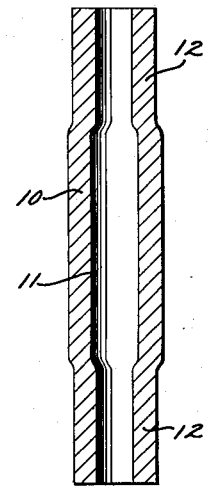
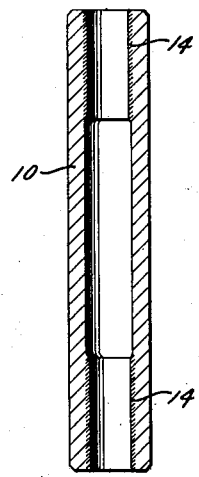
INVENTORS.
William L. H. Doyle
BY Glen C. Riegel
Charles M. Fryer
ATTORNEY.

Patented Mar. 24, 1953

2,632,235

UNITED STATES PATENT OFFICE 2,632,235

METHOD OF FORMING VALVE GUIDES

William L. H. Doyle and Glen C. Riegel, Peoria, Ill., assignors to Caterpillar Tractor Co., San Leandro, Calif., a corporation of California Application September 20, 1947, Serial No. 775,240

1 Claim. (Cl. 29—149.5)

This invention relates to a method of forming valve guides of the kind employed for guiding the stems of the intake and exhaust valves of an internal combustion engine.

In practice, valve guides are of substantially tubular form. The exterior surfaces of the guide is fitted, usually by pressing, into an appropriately located bore in the engine cylinder head casting. The inner surfaces of the tubular casting acts as a bearing for the reciprocally moving valve stem. The guides are customarily made of cast iron and, after being pressed into the cylinder head, they must be finish machined internally, even though they have previously been machined, to insure alignment of their inner or bearing surfaces and to correct reduction of their inside diameters that occurs due to the crushing effect of the press fitting. This machining after assembly is costly and otherwise undesirable.

The present invention contemplates the provision of a valve guide of pearlitic or hardenable malleable iron as distinguished from the customary cast iron guides and the provision of spaced hardened bearing surfaces therein which may be accurately finished therein before assembly and will not be distorted when the guide is fitted into the bore provided for its reception.

It is an object of this invention to provide a valve guide or similar article and method of making the same that overcomes the above mentioned and other disadvantages of other conventional guides and that provides a valve guide capable of being completely finished before its assembly into an engine and in which improved bearing surfaces are obtained.

Further and more specific objects and advantages of the invention and the manner in which they are obtained are made apparent in the following specification by reference to the accompanying drawings.

In the drawings:

Fig. 1 is a view in elevation of a cylindrical casting from which the valve guide of the present invention is made;

Fig. 2 is a central vertical section through the same casting after its ends have been swaged inwardly to reduce the size of its internal bore and to provide stock from which bearings may be cut; and Fig. 3 is a similar view of the same piece after the bearings are cut and hardened and the outside is machined to proper size.

In carrying the invention into practice, a plain cylindrical casting, such as is shown at 10 in Fig. 1, preferably of pearlitic malleable iron, is concentrically bored throughout its length, the bore being indicated at 11 and being somewhat larger than the bearing surfaces required to accommodate the valve stem, which is to slide within the guide. The bore 11 is preferably rough ground and then the casting 10 is swaged inwardly at its ends to provide spaced reduced portions as indicated at 12 in Fig. 2, somewhat smaller in their internal diameter than the intended bearing surfaces for the valve stem. For the sake of uniformity in the swaging operation the outside of the casting may be and is preferably machined before swaging. The reduced bores within the portions 12 are then reamed and ground to size, suitable for the sliding reception of the valve stem. The reduced bores are then hardened, preferably by employing an electrical induction heating process, which is well known, and the bearing surfaces of these bores are hardened exclusively of the rest of the casting so that the only hardened areas are those indicated by the darkened areas 14 in Fig. 3. After hardening, the bearing surfaces may be treated by a final, or finish grinding and they are preferably also chemically etched or otherwise treated to enhance their lubricity and wear resistance characteristics. At this time, or sooner if desired, the exterior cylindrical surface of the casting is machined to its final diameter. This machining results in the removal of the larger diameter between its reduced ends and in providing a suitable size, at least of that portion that is to be pressed into the cylinder head for obtaining the desired tightness of fit.

When a valve guide is made in the manner herein disclosed, it has the advantage of spaced bearing surfaces for the reception of the valve stem and thus presents a reduced area for frictional contact with the stem. Furthermore, because of its malleable nature and the hardened bearing surfaces, it may be pressed into the cylinder head to provide a suitable fit without distortion of the finished bearing surfaces, thus making possible the complete finishing of the valve guide before its assembly into the cylinder head and eliminating the necessity of machining, or dressing, the bearing surfaces after assembly. This is possible because the hardness of the bearing surfaces prevents their being crushed as the guide is being pressed into place and, even though the enlarged cylinder space between the bearing surfaces is crushed or distorted, its dimension is not critical. It is also an advantage to finish the bearing surfaces completely before assembly, so

We claim:

The method of forming a valve guide to be pressed into a receiving bore in an engine and to receive a slidable valve stem which comprises concentrically boring a cylindrical malleable iron member to a dimension exceeding that of the valve stem to be guided, swaging said member inwardly adjacent its ends to reduce said dimension, grinding the reduced portions to provide spaced bearing surfaces, thereafter hardening said surfaces exclusively of the rest of said member, and machining the exterior of the member to size for press fitting whereby the fitting of the member into its receiving bore will not distort the finished bearing surfaces.

WILLIAM L. H. DOYLE.
GLEN C. RIEGEL.

REFERENCES CITED

The following references are of record in the file of this patent:

UNITED STATES PATENTS

| Number | Name | Date |
|---|---|---|
| 652,845 | Halifax | July 3, 1900 |
| 935,659 | Johnson | Oct. 5, 1909 |
| 1,158,369 | Bunting | Oct. 26, 1915 |
| 1,272,051 | Kelley | July 9, 1918 |
| 1,347,490 | Beach | July 27, 1920 |
| 1,714,660 | Crawford | May 28, 1929 |
| 1,826,148 | Lowther | Oct. 6, 1931 |
| 1,845,122 | Briney | Feb. 16, 1932 |
| 1,909,553 | Schermer et al. | May 16, 1933 |
| 2,055,341 | Dyer | Sept. 22, 1936 |
| 2,145,864 | Denneen et al. | Feb. 7, 1939 |
| 2,175,705 | Scott | Oct. 10, 1939 |
| 2,363,050 | Dewey | Nov. 21, 1944 |
| 2,368,007 | Delaham | Jan. 23, 1945 |
| 2,383,727 | Lewis | Aug. 28, 1945 |
| 2,398,364 | Elfstrom | Apr. 16, 1946 |
| 2,423,868 | Bishop | July 15, 1947 |